United States Patent
Kato et al.

(10) Patent No.: US 6,412,937 B1
(45) Date of Patent: Jul. 2, 2002

(54) OIL INK COMPOSITION FOR ELECTROSTATIC ATTRACTION INK JET AND RECORDING PROCESS USING SAME

(75) Inventors: Eiichi Kato; Yusuke Nakazawa, both of Shizuoka (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 0 days.

(21) Appl. No.: 09/427,528

(22) Filed: Oct. 26, 1999

(30) Foreign Application Priority Data

Oct. 28, 1998 (JP) .......................................... 10-307290

(51) Int. Cl.[7] .............................. B41J 2/17; G01D 11/00
(52) U.S. Cl. ........................................ 347/100; 347/95
(58) Field of Search ........................... 347/95, 100, 101, 347/48, 50, 54, 55, 7, 96; 430/115, 116; 106/31.13, 31.36; 524/556

(56) References Cited

U.S. PATENT DOCUMENTS 4,983,486 A * 1/1991 Kato et al. ................. 430/115
5,624,996 A * 4/1997 Morinaga et al. ........... 524/556
6,220,696 B1 * 4/2001 Suetsugu et al. ............. 347/55

* cited by examiner

*Primary Examiner*—Hai Pham
(74) *Attorney, Agent, or Firm*—Reed Smith LLP (57) ABSTRACT

An ink composition for an electrostatic ink jet composed of a nonaqueous solvent having an electrical resistance of not lower than $10^9$ Ω·cm and a dielectric constant of not more than 3.5; a solid particulate material having an average particle diameter of from 0.1 to 3 μm dispersed in a nonaqueous solvent; and at least one fluorine-based surface active agent which is soluble in the nonaqueous solvent. The surface active agent is present in an amount from about 0.05 to 5% by weight based on the weight of the ink composition.

6 Claims, 3 Drawing Sheets

OIL INK COMPOSITION FOR ELECTROSTATIC ATTRACTION INK JET AND RECORDING PROCESS USING SAME

FIELD OF THE INVENTION

The present invention relates to an ink composition for electrostatic attraction (suction) ink jet and to an electrostatic attraction ink jet recording process using the ink composition.

BACKGROUND OF THE INVENTION

Ink jet recording process allows high speed printing with low noise and has recently spread rapidly.

An ink jet printer is adapted to jet a liquid ink having a high fluidity through a fine nozzle onto a recording paper to perform recording. The ink jet printer operates either in an on-demand (voluntary jetting) process or continuous jetting process. As such continuous jetting processes there are known electrostatic jetting processes (e.g., Sweet type, Hertz type). As such on-demand jetting processes there are known piezoelectric process, thermal ink jet process and electrostatic acceleration process.

As the on-demand ink jetting processes using electrostatic force there is known a process so-called electrostatic acceleration ink jet process or slit jet process as disclosed in Susumu Ichinose and Yuji Oba, "Bulletin of Society of Electronic Communications of Japan", vol. J66-C (No. 1), page 47, 1983, Tadayoshi Ono, Ei Mizuguchi, "Bulletin of Society of Image Electronics of Japan", vol. 10, (No. 3), page 157, 1981, etc. Specific examples of these type processes are disclosed in JP-A-56-170 (The term "JP-A" as used herein means an "unexamined published Japanese patent application"), JP-A-56-4467, and JP-A-57-151374.

In this type of ink jet printer, an ink is supplied from an ink tank into a slit ink nozzle or the like comprising a slit ink retaining portion having many electrodes disposed inside thereof, while a high voltage is selectively applied to these electrodes, to thereby jet the ink in the vicinity of the electrodes onto a recording paper disposed closely opposed to the slit.

As one of other types of ink jet recording processes free of slit recording head there is disclosed in JP-A-61-211048 a process which comprises filling pores in a film-like ink support having a plurality of micropores with an ink while a voltage is selectively applied from multi-needle electrodes, to thereby transfer the ink in the pores to a recording paper.

Explaining the mechanism of ink flying, it is interpreted that the high voltage applied to the electrodes disposed causes electric charge to be injected into the ink in contact with these electrodes to thereby electrostatically charge the ink in the vicinity of these electrodes, and hence an electrostatic force is caused to jet the ink. Accordingly, the ink is normally not electrostatically charged. Only when a voltage is applied to these electrodes, the ink is electrostatically charged in the vicinity of these electrodes by energizing, thus obtaining a jetting force. The ink for use in these ink jet recording processes has an electrical resistance of from about $10^5$ to $10^6$ Ω·cm. Since water has a low electrical resistance, an ink obtained by dispersing a coloring agent such as dye in an oily solvent with a dispersing aid such as surface active agent for adjusting the electrical resistance thereof is generally used.

Referring to the oily ink for use in this type of ink jet recording process, there have been proposed a process which comprises controlling the viscosity and specific resistivity of the oily ink (as disclosed in JP-B-52-13127 (The term "JP-B" as used herein means an "examined Japanese patent publication")), a process which comprises controlling the dielectric constant of the dispersion medium to be incorporated in the ink and the specific resistivity of the ink (as disclosed in JP-A-53-29808), a process which comprises changing the kind of the dispersion medium to be incorporated in the oily ink or allowing a specific compound to be incorporated in the oily ink as an ink composition (as disclosed in JP-A-3-79677, JP-A-3-64377, JP-A-4-202386, JP-A-7-109431), etc.

However, the conventional techniques leave something to be desired. For example, the oily ink used in these conventional techniques leaves something to be desired storage stability, reproducibility of recorded image upon repeated use, resistance to ink feathering on transfer material, anticlogging property in nozzle and ink supply passage, stability in ink jetting, etc. Further improvement in these properties has been desired.

On the other hand, another electrostatic suction ink jet technique is disclosed in WO93/11866. This process involves the supply of an ink obtained by dispersing, in an insulating liquid, charged particles or particles which are rendered electrostatically chargeable under the application of electric field into the ink jetting apparatus. Under the application of electric field, a continuous process is effected comprising the steps of (i) forming an ink meniscus at the forward end of a jetting electrode for jetting ink, (ii) allowing the electrostatically chargeable particles in the ink meniscus to be electrophoretically migrated to cause agglomeration (concentration), and (iii) forming an electric field between a counter electrode on which a recording medium is placed and the jetting electrode, to thereby jet the electrostatically chargeable particles thus agglomerated.

Unlike the conventional types of ink jet recording process, this type of ink jet recording process requires no ink nozzle structure. Thus, this type of ink jet recording process can jet an ink comprising dispersed particles of pigment, etc. in the form of fine droplet having a size of about several micrometers. Further, a high concentration droplet as the result of the agglomeration of dispersed particles can be jetted. Moreover, by controlling the jet signal, the size of droplet can be changed, making it possible to change the size of dots in the image.

Accordingly, in accordance with this type of ink jet recording process, an image based on light-resistant and water-resistant pigments and an image comprising a continuous dot gradation can be sharply formed with a high resolution and a high density.

As the oily ink to be used in this type of ink jet recording process WO95/1404 and WO96/10055 disclose an oily ink comprising insoluble and electrostatically chargeable particles and a charging agent each incorporated in an insulating liquid having an electrical resistance of not less than $10^9$ Ω·cm.

Further, an oily ink comprising electrostatically chargeable particles having a specified chargeability or specified average particle diameter has been proposed (as disclosed in JP-A-9-193389, JP-A-8-291267). Moreover, an oily ink which exhibits specified thermal properties when dried has been proposed (as disclosed in JP-A-9-137094).

However, these proposed oily inks are disadvantageous in that they leave something to be desired in jettability in ink jet recording. For example, they cause portions where the oily inks cannot be jetted upon application of a voltage corresponding to the jet signal. Further, these oily inks are occasionally jetted with its dispersed particles being insufficiently agglomerated, causing feathering or lack in density on dots printed on the transfer material. Moreover, in case of changing the application time of pulse voltage during jetting to change the size of dots thus printed to thereby form a continuous gradation, these proposed oily inks cannot be jetted at an efficiency of 100% when the pulse time is reduced to print small dots, making it impossible to form a high resolution image.

On the other hand, with the recent development of office machines and office automation, an offset lithographic printing process has spread in the art of light printing which comprises plate-making or forming an image by various methods on a lithographic printing plate precursor comprising an image-receiving layer provided on a water-resistant support to prepare a printing plate. As one of these plate-making processes there is also practiced an ink jet recording process.

When the foregoing oily ink is printed on such a lithographic printing plate precursor using the foregoing electrostatic suction ink jet recording process, several hundreds of sheets having a sharp image free of lack can be obtained at largest, demonstrating that these proposed oily inks leave something to be desired. In other words, these oily inks are disadvantageous in that the ink particles show an insufficient fixing strength when used in offset printing.

SUMMARY OF THE INVENTION

It is therefore an object of the present invention to provide an ink composition for electrostatic attraction ink jet recording, which provides excellent ink jet stability and provides a fair and high precision fine sharp image having excellent image strength.

Another object of the present invention is to provide an ink composition for electrostatic attraction ink jet recording which enables printing of a large number of sheets of printed matters having a sharp image.

A still other object of the present invention is to provide an improved electrostatic attraction ink jet recording using the ink composition.

Other objects and effects of the present invention will become apparent from the following description.

The above-described objectives of the present invention have been achieved by providing the following ink compositions and ink jet recording process.

(1) An ink composition for electrostatic attraction ink jet, which composition comprises:

a nonaqueous solvent having an electrical resistance of not lower than $10^9$ Ω and a dielectric constant of not more than 3.5;

a dispersoid dispersed in said nonaqueous solvent, which comprises at least a solid particulate material having an average particle diameter of from 0.1 to 3 μm; and at least one fluorine-based surface active agent soluble in said nonaqueous solvent, said surface active agent being present in an amount of from 0.05 to 5% by weight based on the weight of the ink composition.

(2) The ink composition according to the above (1), wherein said solid particulate material is a positively or negatively charge detectable particulate material.

(3) The ink composition according to the above (1) or (2), wherein said solid particulate material comprises a particulate resin material which is hydrophobic and which stays solid at least at ordinary temperature.

(4) The ink composition according to any one of the above (1) to (3), wherein said fluorine-based surface active agent is a polymer compound comprising a polymer component containing a fluorine-containing substituent having a weight-average molecular weight of from 800 to 30,000.

(5) An electrostatic attraction ink jet recording process, which comprises the steps of:

supplying an oily ink composition into a jetting portion; and applying an electrostatic field to said jetting portion to jet said oily ink composition, wherein said ink composition is an ink composition according to any one of the above (1) to (4).

BRIEF DESCRIPTION OF THE DRAWINGS

By way of example and to make the description more clear, reference is made to the accompanying drawings in which.

DETAILED DESCRIPTION OF THE INVENTION

The oily ink for use in the present invention will be further described below.

The oily ink of the present invention comprises at least one fluorine-based surface active agent soluble in a nonaqueous solvent used for ink.

The fluorine-based surface active agent is incorporated in the ink in an amount of from 0.05 to 5% by weight, preferably from 0.1 to 3% by weight, based on the total weight of the ink. When the oily ink containing such a fluorine-based surface active agent in an amount falling within this range is used in electrostatic attraction ink jet recording process, an ink meniscus can be stably formed at the jetting portion, making it possible to jet the ink with a good reproducibility free from trouble in jetting even during high speed printing or printing of fine dots. Further, dots thus printed are free of feathering or disturbance in shape, making it possible to form a high precision image.

Such an effect is given because the electrophoresis and agglomeration of particles dispersed in the ink and jetting become easier and can be attained by the constitution of the present invention. One of the possible significant reasons for this effect is that the incorporation of the above-mentioned surface active agent will adjust the surface tension and viscosity of the oily ink to a range of from 16 to 25 dyne/cm (at 25° C.) and from 0.5 to 3.0 cp (at 25° C.), respectively. Besides this reason, other factors causing enhancement of agglomeration during jetting can be thought. However, the details of these factors are not yet presumed. Preferably, the oily ink exhibits a surface tension of from 17 to 23 dyne/cm and a viscosity of from 0.6 to 1.8 cp.

It is thought that if the conventional oily ink for use in the electrostatic attraction ink jet process comprises a $C_{6-8}$ aliphatic hydrocarbon (e.g., hexane, heptane, octane) as an ink dispersant, it can be jetted with its electrostatically chargeable dispersed particles being agglomerated because the dispersant itself exhibits a low surface tension and a low viscosity. However, such a solvent has a low boiling point and thus can be easily evaporated and exhibits a low ignition point and thus can be easily ignited, resulting in the variation of ink density or the clogging of the ink passage. In order to eliminate these difficulties, a large-scaled apparatus for preventing the evaporation or ignition of the solvent is required. It has been difficult put such a large-scaled apparatus into practical use.

The incorporation of the nonaqueous solvent-soluble fluorine-based surface active agent in the oily ink in accordance with the present invention makes it possible to exert an effect of stably jetting the oily ink with its dispersed particles agglomerated even if other solvents than those described above, which does not cause the above-described problems.

The fluorine-based surface active agent employable herein will be further described below.

The fluorine-based surface active agent for use in the present invention is soluble in nonaqueous solvents used for ink and is preferably a nonionic fluorine-based surface active agent.

Examples of the fluorine atom-containing compound include compounds containing substituents such as monovalent and divalent organic residues (e.g., $—C_n(F)_{2n+1}$ (in which n represents an integer of from 1 to 22), $—CFH_2$, $—CF_2H$, $—CF_2—$, $—CFH—$).

These fluorine atom-containing organic residues may be combined with each other. In this case, these organic residues may be connected to each other directly or via other connecting groups. Specific examples of these connecting groups include divalent organic residues. More specifically, examples thereof include divalent aliphatic groups and divalent aromatic groups, each of which may be interposed by a bonding group selected from $—O—$, $—S—$, $—Si(d^1)(d^2)—$, $—N(d^1)—$, $—CO—$, $—SO—$, $—SO_2—$, $—COO—$, $—OCO—$, $—CONHCO—$, $—NHCONH—$, $—CON(d^1)—$ and $—SO_2N(d^1)—$, and divalent organic residues comprising a combination of these groups. In the foregoing, $d^1$ and $d^2$ each represents a $C_{1-8}$ alkyl group or a fluorine atom-containing alkyl group obtained by connecting $—CFH_2$ group or $—CF_2H$ group to an organic residue comprising a combination of divalent connecting groups such as $—CH_2H—$, $—CFH—$ and $—CF_2—$.

Preferred examples of the fluorine atom-containing compound include polymer compounds comprising a polymer component containing the foregoing fluorine atom-containing substituent. Such a substituent may be incorporated in the main chain of the polymer or contained as a substituent on the side chains in the polymer compound.

Since these polymer compounds are soluble in the dispersant used for oily ink, they may contain other copolymer components. Examples of the copolymer components include repeating units represented by the general formula (I) given below. The substituent R is as defined below. Examples of these copolymer components include components containing long-chain alkyl group or alkenyl group.

The form of polymerization of the polymer component containing fluorine atom and other copolymer components may be either random-copolymerization or block-copolymerization (including graft-polymerization).

The weight-average molecular weight of the fluorine-based polymer compound is preferably from $8×10^2$ to $3×10^4$, more preferably from $1×10^3$ to $1.5×10^4$. When the weight-average molecular weight of the fluorine-based polymer compound falls within this range, an excellent effect of adjusting the surface tension of the oily ink can be exerted without increasing the viscosity of the oily ink.

Preferred examples of the nonaqueous solvent having an electrical resistance of not lower than $10^9$ Ω and a dielectric constant of not greater than 3.5 for use in the oily ink composition of the present invention include straight-chain or branched aliphatic hydrocarbon, alicyclic hydrocarbon, compounds obtained by substituting hydrogen on these hydrocarbons by halogen atoms, silicone liquid, and silicone oil.

Examples of the hydrocarbon solvent include octane, isooctane, decane, isodecane, decalin, nonane, dodecane, isododecane, cyclohexane, cyclooctane, cyclodecane, Isoper E, Isoper H. Isoper L (Isoper, produced by Exxon Corp.), Shellsol 70, Shellsol 71 (Shellsol, produced by Shell Oil Co.), and Amsco OMS and Amsco 460 (Amsco, produced by Spirits Inc.).

As the halogen-substituted hydrocarbon solvent there may be used a fluorocarbon solvent. Examples of the fluorocarbon solvent employable herein include perfluoroalkanes represented by formula $C_nF_{2n+2}$ such as $C_7F_{16}$ and $C_8F_{18}$ (e.g., Florinate PF5080, Florinate PF5070, produced by Sumitomo 3M), fluorine-based inert liquids (e.g., Florinate FC series), fluorocarbons (e.g., Clitox GPL series, produced by Du Pont Japan Limited, Flons such as HCFC-141b, produced by Daikin Industries, Ltd.), and fluorocarbon iodides such as $[F(CF_2)_2CH_2CH_2I]$ and $[F(CF_2)_3I]$ (e.g., I-1420, I-1600, produced by Daikin Fine Chemical Laboratory).

Examples of the silicon solvent employable herein as silicone liquid or silicone oil include dialkyl polysiloxane (e.g., hexanemethyl disiloxane, tetramethyl disiloxane, octamethyl trisiloxane, hexanemethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil (e.g., KF56, KF58, produced by Shin-etsu Silicone Co., Ltd.).

These solvents may be used singly or in admixture. The upper limit of the electrical resistance of such a nonaqueous solvent is about $10^{16}$ Ω·cm. The electrical resistance of the nonaqueous solvent is preferably from $10^9$ to $10^{14}$ Ω·cm. The lower limit of the dielectric constant of the nonaqueous solvent is about 1.8 g. The dielectric constant of the nonaqueous solvent is preferably from 1.85 to 3.0.

The reason for regulating the electrical resistance of the nonaqueous solvent to the above-defined range is as follows. If the oily ink has a reduced electrical resistance in the electric field-controlled ink jet recording process in which ink is jetted with electrostatic attraction, it results in improper electrical resistance to thereby deteriorate the ink jet by the application of electric field. The reason for regulating the dielectric constant of the nonaqueous solvent to the above-defined range is that when the oily ink exhibits an increased dielectric constant, the electric field can be easily relaxed in the ink, which tends to deteriorate the ink jet.

The solid particles to be dispersed in the foregoing nonaqueous solvent have an average diameter of preferably from 0.1 to 3 μm, more preferably from 0.2 to 1.0 μm. Further, the dispersed particles for use in the present invention are positively or negatively charge detectable particles.

The dispersed particles are inorganic or organic pigment particles, insoluble dye particles, polymer particles or mixture thereof. The dispersed particles are present in a concentration of preferably from 0.5 to 30% by weight, more preferably from 1 to 20% by weight, based on the total weight of the ink composition. When the concentration of the dispersed particles falls within the above-defined range, the ink can be stably jetted through the jet head, resulting in the formation of good printed image.

The solid particulate material dispersed in the oily ink preferably comprises a particulate resin material which stays solid at least at ordinary temperature, more preferably at a temperature of not higher than 35° C. and which is hydrophobic. The particulate resin preferably has a glass transition point of from −5° C. to 110° C. or a softening point of from 33° C. to 140° C. (hereinafter sometimes referred to as "resin (P)"), more preferably a glass transition point of from 10° C. to 100° C. or a softening point of from 38° C. to 120° C., and further preferably a glass transition point of from 15° C. to 80° C. of a softening point of from 38° C. to 100° C.

The use of such a resin having a glass transition point or softening point falling within the above defined range makes it possible to improve the image fixability and sufficiently maintain the mechanical strength of the image thus fixed to advantage. Further, the use of such a resin makes it possible to provide a sufficient image strength and a satisfactory press life even if used for an ink jet-recording offset printing plate.

The weight-average molecular weight (Mw) of the resin (P) is preferably from $3\times10^3$ to $1\times10^6$, more preferably from $5\times10^3$ to $8\times10^6$, further more preferably from $1\times10^4$ to $5\times10^5$.

Specific examples of the resin (P) include olefin polymer and olefin copolymer (e.g., polyethylene, polypropylene, polyisobutyrene, ethylene-vinyl acetate copolymer, ethylene-acrylate copolymer, ethylene-methacrylate copolymer, ethylene-methacrylic acid copolymer), vinyl chloride copolymer (e.g., polyvinyl chloride, vinyl chloride-vinyl acetate copolymer), vinylidene chloride copolymer, vinyl alkanate polymer and vinyl alkanate copolymer, allyl alkanate polymer and allyl alkanate copolymer, styrene, styrene derivative polymer, styrene derivative copolymer (e.g., butadiene-styrene copolymer, isoprene-styrene copolymer, styrene-methacrylate copolymer, styrene-acrylate copolymer), acrylonitrile copolymer, methacrylonitrile copolymer, alkyl vinyl ether copolymer, acrylic acid; ester polymer, ester copolymer, methacrylic acid ester polymer, methacrylic acid ester copolymer, itaconic acid diester polymer, itaconic acid diester copolymer, maleic anhydride copolymer, acrylamide copolymer, methacrylamide copolymer, phenolic resin, alkyd resin, polycarbonate resin, ketone resin, polyester resin, silicone resin, amide resin, hydroxyl group-modified polyester resin, carboxyl group-modified polyester resin, butyral resin, polyvinyl acetal resin, urethane resin, rosin, hydrogenated rosin, petroleum resin, hydrogenated petroleum resin, maleic acid resin, terpene resin, hydrogenated terpene resin, chroman-indene resin, cyclized rubber-methacrylic acid ester copolymer, cyclized rubber-acrylic acid ester copolymer, copolymer containing nitrogen-free heterocyclic group (Examples of such a heterocyclic group include furan ring, tetrahydrofuran ring, thiophene ring, dioxane ring, dioxofuran ring, lactone ring, benzofuran ring, benzothiophene ring, and 1,3-dioxetane ring), and epoxy resin.

The content of the particulate resin dispersed in the oily ink of the present invention is preferably from 1 to 100% by weight based on the total weight of the solid particulate material to be dispersed.

The proportion of the particulate resin, if the oily ink is used to form an image on offset printing plate, is preferably from 10 to 100% by weight, more preferably from 30 to 100% by weight. If the proportion of the particulate resin falls within the above defined range, the resulting image exhibits an enhanced fixability and the mechanical strength of the image thus fixed can be sufficiently maintained to advantage. Even if used as an offset printing plate, the image thus formed exhibits a sufficient press life.

Preferably, the oily ink of the present invention normally contains a coloring material incorporated therein as a coloring component besides the foregoing dispersed resin particles.

As the coloring material there may be used any pigment or dye which has heretofore been incorporated in oily ink compositions or electrostatic photographic liquid developers.

As the pigment there may be used any pigment which has heretofore been commonly used in the art of printing regardless of which it is inorganic or organic. Specifically, known pigments such as carbon black, cadmium red, molybdenum red, chromium yellow, cadmium yellow, titanium yellow, chromium oxide, pyridian, cobalt green, ultramarine blue, prussian blue, cobalt blue, azo pigment, phthalocyanine pigment, quinacridone pigment, isoindolinone pigment, dioxazine pigment, threne pigment, perylene pigment, perinone pigment, thioindigo pigment, quinophthalone pigment and metal complex pigment may be used without any specific restriction.

Preferred examples of the dye employable herein include oil-soluble dyes such as azo dye, metal complex dye, naphthol dye, anthraquinone dye, indigo dye, carbonium dye, quinonimine dye, xanthene dye, cyanine dye, quinoline dye, nitro dye, nitroso dye, benzoquinone dye, naphthoquinone dye, phthalocyanine dye and metal phthalocyanine dye.

These dyes or pigments may be used singly or in an appropriate combination. These dyes or pigments are preferably incorporated in the oily ink in a proportion of from 0.01 to 5% by weight based on the total weight of the oily ink composition.

These coloring materials may be dispersed directly in the nonaqueous solvent separately with the dispersed resin particles or may be incorporated in the dispersed resin particles. If the latter arrangement is employed, the pigment or the like can be usually covered by the resin material constituting the dispersed resin particles to form resin-coated particles. Alternatively, the dye or the like can be usually used to color the surface of dispersed resin particles to form colored particles.

The preparation of the nonaqueous dispersed particles can be accomplished by known mechanical grinding process or polymerization granulation process. Examples of the mechanical grinding process include a process which comprises optionally mixing materials (resin and/or coloring material) to be finely divided, melting and kneading the materials to be finely divided, directly grinding the mixture by a known grinder to form a particulate material, and then dispersing the particulate material with a dispersion polymer by means of a wet dispersing machine (e.g., ball mill, paint shaker, keddy mill, dynomill), and a process which comprises kneading particulate resin component materials and a dispersion-aiding polymer (or coating polymer) to form a kneaded material, grinding the kneaded material, and then dispersing the material thus ground with a dispersion polymer. Specifically, processes for the preparation of coating material or electrostatic photographic liquid developer may be employed. For the details of these preparation processes, reference can be made to "Toryo no ryudo to ganryo bunsan (Fluidity of coating and pigment dispersion)", translated under the supervision of Kenji Ueki, Kyoritsu Shuppan, 1971, Solomon, "Toryo no kagaku (Chemistry of paint)", "Paint and Surface Coating Theory and Practice", Yuji Harasaki, "Coating Engineering", Asakura Shoten, 1971, "Kotingu no kiso kagaku (Fundamental Chemistry of Coating)", Makishoten, 1977, etc.

The polymerization and granulation of the resin to be dispersed can be accomplished by any known nonaqueous dispersion polymerization method. For the details of this method, reference can be made to "Chobiryushi porima no saishin gijutsu (Modern technology of ultrafinely divided polymer particles)", compiled under the supervision of Soichi Muroi, Chapter 2, CMC, 1991, Koichi Nakamura, "Saikin no denshishashin genzo sisutemu to tona zairyo no kaihatsu to jitsuyoka (Recent development and practical use of electrophotographic development system and toner materials)", Chapter 3, Nihon Kagaku Joho K. K., 1985, K. E. J. Barret, "Dispersion Polymerization in Organic Media", John Wiley, 1975, etc.

In general, a dispersion polymer is used to stabilize the dispersion of particles in a nonaqueous solvent. The dispersion polymer comprises as a main component a repeating unit soluble in a nonaqueous solvent and has a weight-average molecular weight (Mw) of from $1 \times 10^3$ to $1 \times 10^6$, preferably from $5 \times 10^3$ to $5 \times 10^5$.

Preferred examples of the soluble repeating unit which can be incorporated in the dispersion polymer include polymer components represented by the following general formula (I):

In the following general formula (I), $X_1$ represents —COO—, —OCO— or —O—.

R represents a $C_{10-32}$, preferably $C_{10-22}$, alkyl or alkenyl group which may be straight-chain or branched This alkyl or alkenyl group is preferably unsubstituted but may contain substituents.

Specific examples of the alkyl or alkenyl group include decyl group, dodecyl group, tridecyl group, tetradecyl group, hexadecyl group, octadecyl group, eicosanyl group, docosanyl group, decenyl group, dodecenyl group, tridecenyl group, hexadecenyl group, octadecenyl group, and linolenyl group.

The suffixes $a_1$ and $a_2$ may be the same or different. Preferred examples of $a_1$ or $a_2$ include hydrogen atom, halogen atom (e.g., chlorine, bromine), cyano group, $C_{1-3}$ alkyl group (e.g., methyl, ethyl, propyl), —COO—$Z^1$, and —CH$_2$COO—$Z^1$ (in which $Z^1$ represents a hydrogen atom or a hydrocarbon group having 22 or less carbon atoms which may be substituted (e.g., alkyl, alkenyl, aralkyl, alicyclic group, aryl)).

$Z^1$ represents a hydrogen atom or hydrocarbon group. Preferred examples of the hydrocarbon group include $C_{1-22}$ alkyl group which may be substituted (e.g., methyl, ethyl, propyl, butyl, heptyl, hexyl, octyl, nonyl, decyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl, 2-methoxyethyl, 3-bromopropyl), $C_{4-18}$ alkyl group which may be substituted (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, linolenyl), $C_{7-12}$ aralkyl group which may be substituted (e.g., benzyl, phenethyl, 3-phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, dimethoxybenzyl), $C_{5-8}$ alicyclic group which may be substituted (e.g., cyclohexyl, 2-cyclohexylethyl, 2-cyclopentylethyl), and $C_{6-12}$ aromatic group which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidephenyl, propioamidephenyl, dodecyloylamidephenyl).

The foregoing dispersion polymer may comprise other repeating units incorporated therein as copolymer components besides the repeating unit represented by the general formula (I). The copolymer components may be derived from any monomers copolymerizable with the monomer corresponding to the repeating unit of the general formula (I).

The proportion of the polymer component represented by the general formula (I) in the dispersion polymer is preferably not less than 50% by weight, more preferably not less than 60% by weight.

The form of polymerization of the polymer component represented by formula (I) and other copolymer components may be either random-copolymerization, block-copolymerization or graft-polymerization.

As these dispersion polymers there may be used those described in U.S. patent application Ser. Nos. 09/008,544, 09/085,100, 09/009,692, 09/009,131 and 09/066,600, JP-A-10-204354 and JP-A-10-306244.

Preferably, the dispersion polymer is previously added to the material which is then subjected to polymerization to prepare the particulate resin (P) in the form of emulsion (latex) or the like.

The amount of the dispersion polymer, if used, is preferably from about 0.05 to 4% by weight based on the total weight of the ink.

The dispersed resin particles and colored particles (or coloring material particles) in the oily ink of the present invention are preferably positively or negatively charge detectable particles.

In order to render these particles electroscopically detectable, techniques for wet electrostatic electrophotographic developer may be properly used. In some detail, electroscopically detectable materials and other additives described in the above cited "Saikin no denshishashin genzo sisutemu to tona zairyo no kaihatsu to jitsuyoka (Recent development and practical use of electrophotographic development system and toner materials)", pp. 139–148, "Denshishashin gijutsu no kiso to ouyou (Base and application of electrophotographic technology)", Corona, pp. 497–505, 1988, and Yuji Harasaki, "Denshishasin (Electrophotography)", vol. 16 (No. 2), page 44, 1977, may be used.

Examples of metal soap to be used as electroscopically detectable material include salt of $C_{6-24}$ aliphatic acid (e.g., 2-ethylhexylic acid, 2-ethylcaproic acid, lauric acid, palmitic acid, elaidic acid, linoleic acid, liminolic acid, oleic acid, stearic acid, enanthic acid, naphthenic acid, ethylenediaminetetraacetic acid), resin acid, dialkylsuccinic acid, alkylphthalic acid and alkylsalicyclic acid with metal such as Na, K, Li, B, Al, Ti, Ca, Pb, Mn, Co, Zn, Mg, Ce, Ag, Cd, Zr, Cu, Fe and Ba. Specific examples of these metal soaps are described in U.S. Pat. Nos. 3,411,936 and 3,900,412, JP-B-49-27707 (The term "JP-B" as used herein means an "examined Japanese patent application"), and JP-A-51-37651, JP-A-52-38937, JP-A-52-17837, and JP-A-53-123138.

Examples of organic phosphoric acids or salts thereof to be used as electroscopically detectable material include mono-, di- or trialkylphosphoric acid or dialkyldithiophosphoric acid comprising $C_{3-18}$ alkyl group as exemplified in British Patents 1,411,739 and 1,276,363.

Examples of organic sulfonic acids or salts thereof to be used as electroscopically detectable materials include long-chain aliphatic sulfonic acid, long-chain alkylbenzenesulfonic acid, dialkylsulfosuccinic acid and metal salts thereof exemplified as amphoteric surface active compounds in JP-B-47-37128, JP-A-53-123138, JP-A-51-47437, JP-A-50-79640 and JP-A-53-30340, phospholipid such as lecithin and cepharine as described in JP-B-51-47046, β-alanine containing alkyl group having 8 or more carbon atoms as described in JP-A-50-17642 and JP-A-49-17741, metal complex of β-diketones as described in JP-B-49-27707, and copolymer containing semiamide maleate component as described in JP-B-6-19596 and JP-B-6-19595.

These charge adjustors (CD) may be used singly or in combination.

The foregoing charge adjustor is preferably incorporated in an amount of from 0.001 to 1.0 parts by weight based on 1,000 parts by weight of the dispersant used as carrier liquid.

The oily ink of the present invention may further comprise various additives incorporated therein as necessary besides the foregoing materials.

The upper limit of the total amount of these additives is regulated by the electrical resistance, surface tension and viscosity of the oily ink thus obtained. In other words, when the foregoing various physical properties fall outside the above-defined range, it is difficult to obtain a continuous tone image having a good quality in some cases. Accordingly, the addition amount of the various additives are preferably controlled within the above-defined range.

The process for the formation of an image on a transfer material by electrostatic attraction ink jet process using an oily ink of the present invention will be described below.

The description will be made with reference to a process which comprises using a printing plate precursor as a material onto which an image is transferred and formed (plate-forming process) to form a printing plate.

Printing plate precursors to be used herein can be roughly divided into two groups, i.e., one comprising an image-receiving layer having a hydrophilic surface that allows lithographic printing and one comprising an image-receiving layer having a hydrophobic surface. Either one of the two groups can be used.

As the water-resistant support having a hydrophilic surface that allows lithographic printing employable herein there may be used any material which can provide a hydrophilic surface suitable for lithographic printing. Any support which has heretofore been incorporated in offset printing plates can be used as it is. Specific examples of such a support include substrates having a hydrophilic surface such as plastic sheet, paper having impression capacity, aluminum plate, zinc plate, bimetal plate (e.g., copper-aluminum plate, copper-stainless steel plate, chromium-copper plate), and trimetal plate (e.g., chromium-copper-aluminum plate, chromium-lead-iron plate, chromium-copper-stainless steel). The thickness of the support of the present invention is preferably from 0.1 to 3 mm, particularly from 0.1 to 1 mm.

The support having an aluminum surface is preferably subjected to surface treatment such as graining, dipping in an aqueous solution of sodium silicate, fluorinated potassium zirconate, phosphate or the like and anodization. Further, as disclosed in U.S. Pat. No. 2,714,066, an aluminum plate which has been grained and then dipped in an aqueous solution of sodium silicate may be preferably used. Moreover, as disclosed in JP-B-47-5125, an aluminum plate which has been anodized and then dipped in an aqueous solution of silicate of alkali metal may be preferably used.

The foregoing anodization can be accomplished by passing electric current through an aluminum plate as an anode in an electrolyte comprising an aqueous or non-aqueous solution of inorganic acid such as phosphoric acid, chromic acid, sulfuric acid and boric acid, organic acid such as oxalic acid and sulfamic acid and salts thereof, singly or in combination.

Alternatively, silicate electrodeposition process as disclosed in U.S. Pat. No. 3,658,662 is effective. Treatment with a polyvinylsulfonic acid as disclosed in West German Patent Publication No. 1,621,478 is appropriate as well. The combination of the ink and recording process according to the present invention makes it possible to effect printing with the particles in the ink being sufficiently concentrated free from feathering on the image even on the metallic surface.

Such a hydrophilic treatment is effected to render the surface of the support hydrophilic as well as to enhance the adhesion to a toner image formed thereon. In order to adjust the adhesion between the support and the ink image, a surface layer may be provided on the surface of the support.

In the case where a plastic sheet or paper is used as a support, it is natural that areas other than the ink image portion be hydrophilic. Accordingly, a plastic sheet or paper having a hydrophilic surface layer is used. In some detail, any known direct anchor type lithographic printing plate precursor or printing plate material having a layer similar to the image-receiving layer of such a printing plate precursor may be used.

For example, the image-receiving layer may be mainly composed of a water-soluble binder, an inorganic pigment and a water-resisting agent. As the water-soluble binder there may be used a water-soluble resin such as PVA, modified PVA (e.g., carboxylated PVA), starch, starch derivative, CMC, hydroxyethyl cellulose, casein, gelatin, polyvinyl pyrrolidone, vinyl acetate-crotonic acid copolymer and styrene-maleic acid copolymer.

Examples of the water-resisting agent employable herein include initial condensate of aminoplast such as glyoxal, melamine formaldehyde resin and urea formaldehyde, modified polyamide resin such as methylolated polyamide resin, polyamide-polyamine-epichlorohydrin adduct, polyamide epichlorohydrin resin, and modified polyamide polyimide resin. Examples of the inorganic pigment employable herein include kaolin clay, calcium carbonate, silica, titanium oxide, zinc oxide, barium sulfate, and alumina. Preferred among these inorganic pigments is silica.

The image-receiving layer may further comprise a crosslinking agent such as ammonium chloride and silane coupling agent incorporated therein.

On other hand, the printing plate precursor comprising an image-receiving layer having a hydrophobic surface is, after the image formation, subjected to a treatment process which comprises desensitizing the non-image area (i.e., rendering the surface printing ink-repellent and hydrophilic) to form a printing plate.

Examples of these printing plate precursors include printing plate precursor comprising an image-receiving layer containing at least zinc oxide and a binder resin, and printing plate precursor comprising an image-receiving layer containing at least a hydrophobic binder resin which undergoes chemical reaction during desensitization (e.g., treatment with a treatment solution, irradiation with light beam, heat treatment) to become hydrophilic (as disclosed in JP-A-1-226394, and JP-B-7-94191).

The lithographic printing plate precursor comprising an image-receiving layer containing at least zinc oxide and a binder resin will be described below.

As zinc oxide employable herein there may be used any material commercially available as zinc oxide, zinc white, wet zinc white or active zinc white as disclosed in "Handbook of pigments", compiled by Nihon Ganryo Gijutsu Kyokai, Seibundo, page 319, 1968.

In other words, zinc oxides are classified as dry process zinc oxide such as French process (indirect process) zinc oxide and American process (direct process) or wet process zinc oxide according to starting materials and preparation process used. Examples of these zinc oxides include those commercially available from Seido Chemical Industry Co., Ltd., Sakai Chemical Industry Co., Ltd., Hakusui Tech Co., Ltd., The Honjo Chemical Corporation, Toho Zinc Co., Ltd., Mitsui Mining & Smelting Co., Ltd., etc.

The content of zinc oxide in the image-receiving layer is from 75 to 90% by weight, preferably from 78 to 88% by weight.

When the content of zinc oxide falls within the above-defined range, the effect of the present invention can be enhanced. In other words, the surface of the image-receiving layer can be rendered sufficiently hydrophilic upon desensitization. Further, a required amount of binder resin can secure mechanical strength of the image-receiving layer.

The binder resin to be incorporated in the image-receiving layer of the present invention is a hydrophobic resin which constitutes the image-receiving layer with zinc oxide as mentioned above. The weight-average molecular weight Mw of the binder resin is preferably from $10^3$ to $10^6$, more preferably from $5 \times 10^3$ to $5 \times 10^5$. The glass transition point of the binder resin is preferably from 0° C. to 120° C., more preferably from 10° C. to 90° C.

Specific examples of the binder resin employable herein include vinyl chloride-vinyl acetate copolymer, styrene-butadiene copolymer, styrene-methacrylate copolymer, methacrylate copolymer, acrylate copolymer, vinyl acetate copolymer, polyvinyl butyral, alkyd resin, epoxy resin, epoxy ester resin, polyester resin, and polyurethane resin.

These resins may be used singly or in combination.

The image-receiving layer of the present invention may further comprise other constituents incorporated therein besides the foregoing constituents.

As the other constituents employable herein there may be used inorganic pigments other than zinc oxide to be used herein. Examples of these inorganic pigments include kaolin clay, calcium carbonate, barium carbonate, calcium sulfate, barium sulfate, magnesium carbonate, titanium oxide, silica, and alumina. These other inorganic pigments, if any, may be incorporated in an amount of not greater than 20 parts by weight based on 100 parts by weight of zinc oxide.

The image-receiving layer may further comprise a particulate resin such as particulate acrylic resin having a specific functional group disclosed in JP-A-4-201287, JP-A-4-223196, JP-A-4-319491, JP-A-5-58071, JP-A-4-353495 and JP-A-5-119545 incorporated therein to enhance the desensitization thereof. These resin particles are normally spherical and have an average diameter of from 0.1 to 2 µm.

The use of these other inorganic pigments or resin particles makes it possible to attain sufficient desensitization (hydrophilic treatment) of non-image area upon desensitization, inhibiting background stain on the printed matter. The use of these constituents allows the image area to come in sufficient contact with the image-receiving layer, making it possible to obtain a sufficient press life without causing image defects even after many sheets of printing.

The image-receiving layer may further comprise a crosslinking agent incorporated therein to enhance the strength thereof.

The binder resin in the image-receiving layer composition which has been applied to the support is then preferably photoset and/or thermoset. In order to effect thermosetting, the binder resin may be dried under severer conditions than for conventional process for the preparation of image-receiving layer. Drying is preferably effected at higher temperature and/or for a longer period of time. Alternatively, the binder resin which has been dried to remove the coating solvent is preferably further subjected to heat treatment, e.g., at a temperature of from 60° C. to 150° C. for 5 to 120 minutes. The use of the foregoing reaction accelerator makes it possible to effect treatment under milder conditions.

Alternatively, the specific functional group in the resin may be photoset. As the process for irradiating the resin with light beam there may be used a process involving irradiation with chemically active light beam. As the chemically active light beam there may be used any of visible light, ultraviolet rays, far ultraviolet rays, electron rays, X-ray, γ-ray and α-ray. Preferred among these chemically active light beams are ultraviolet rays, particularly having a wavelength ranging from 310 nm to 500 nm. In general, low voltage, high voltage or ultrahigh voltage mercury vapor lamp may be used. For the irradiation with light beam, the resin can be disposed at a distance of from 5 cm to 50 cm from the light source. The irradiation time is from 10 seconds to 10 minutes. In this arrangement, irradiation can be sufficiently made.

The thickness of the image-receiving layer of the present invention is preferably from about 3 to 30 g as calculated in terms of coated amount (dried) of image-receiving layer composition per m² of printing plate precursor. The image-receiving layer normally exhibits a void of from 3 to 50 vol-%, preferably from 10 to 40 vol-%.

The image-receiving layer in the present invention is provided on a water-resistant support. As such a water-resistant support there may be used a water-resisted paper or plastic film, a metal foil-laminated paper or plastic film or the like.

The support for use herein preferably has a Bekk smoothness of not less than 300 sec/10 cc, more preferably from 900 to 3,000 sec/10 cc, further preferably from 1,000 to 3,000 sec/10 cc, on the surface thereof adjacent to the image-receiving layer.

The regulation of the surface smoothness of the support adjacent to the image-receiving layer to a range of not less than 300 sec/10 cc as calculated in terms of Bekk smoothness makes it possible to further enhance the image reproducibility and prolong the press life. The foregoing effect of enhancing the image reproducibility and prolonging the press life can be exerted even if the surface smoothness of the support is the same as that of the image-receiving layer. This is presumably because the increase in the surface smoothness of the support makes it possible to enhance the adhesion between the image area and the image-receiving layer.

The surface of the water-resistant support thus regulated to be highly smooth means the surface of the support to which the image-receiving layer is directly applied. For example, if an underlayer or overcoat layer described below is provided on the support, the highly smooth surface means the surface of such an underlayer or overcoat layer. In this arrangement, an image-receiving layer the surface conditions of which have been adjusted as mentioned above can be sufficiently maintained without following the surface roughness of the support, making it possible to further improve the image quality.

The predetermination of the surface smoothness to the above-defined range can be accomplished by various known methods. Specific examples of these methods include a method which comprises adjusting the Bekk smoothness of the surface of the support by melt-bonding a resin to the surface of the substrate or calendering the surface of the substrate through highly smooth heated rollers.

The melt-bonding of the foregoing resin is preferably carried out by extrusion laminating method in the present invention. The employment of the extrusion laminating method makes it possible to prepare a support the smoothness of which is adjusted to a desired value. The extrusion laminating method comprises melting a resin, forming the molten resin into a film, immediately contact-bonding the film onto paper, and then cooling the laminate. Various apparatus have been known for extrusion laminating method.

The thickness of the resin layer to be thus laminated is not less than 10 $\mu$m. preferably from 10 $\mu$m to 30 $\mu$m from the standpoint of stability of production.

In the present invention, an underlayer may be provided interposed between the support and the image-receiving layer for the purpose of enhancing the water resistance and interlayer adhesion as mentioned above. Further, a back coat layer (back layer) may be provided on the surface of the support opposite the image-receiving layer for the purpose of inhibiting curling. The smoothness of the back coat layer is preferably from 150 to 700 sec/10 cc.

In this arrangement, the resulting printing plate can be accurately set in the offset printing machine without being displaced or slippery.

In order to adjust the smoothness of the underlayer and the back coat layer to the respective desired range, the support may be subjected to calendering a plurality of times. In some detail, the support on which an underlayer has been formed may be calendered, provided with a back coat layer, and then calendered again. Alternatively, the adjustment of the formulation such as proportion and grain size of pigment incorporated in the underlayer and back coat layer and the adjustment of calendering conditions may be properly combined to control the smoothness.

As the substrate to be incorporated in the printing plate precursor of the present invention there may be used a substrate such as wood paper, synthetic pulp paper, paper made of mixture of wood pulp and synthetic pulp, nonwoven cloth, plastic film, cloth, metal sheet and composite thereof as it is. In order to obtain smoothness defined in the present invention and adjust the water resistance and other properties, the foregoing substrate may be impregnated with a coating compound made of hydrophobic resin, water-dispersible resin, pigment, etc. to be incorporated in the underlayer or backcoat layer described later.

In the present invention, a support having an underlayer and a back coat layer provided on the foregoing substrate is preferably used to satisfy requirements for lithographic printing plate precursor, i.e., printability such as recording properties, water resistance and durability and adjust the smoothness to the foregoing desired range. Such an underlayer and back coat layer can be formed by applying and drying a coating solution containing a resin and a pigment onto a support or laminating the coating compound on the support. As the resin to be used herein there may be used properly selected from the group consisting of various resins. Specific examples of hydrophobic resin to be used as such a resin include acrylic resin, vinyl chloride resin, styrene resin, styrene-butadiene resin, styrene-acryl resin, urethane resin, vinylidene chloride resin, and vinyl acetate resin. Specific examples of hydrophilic resin to be used as such a resin include polyvinyl alcohol resin, cellulose derivative, starch, starch derivative, polyacrylamide resin, and styrene-maleic anhydride copolymer.

Examples of the pigment employable herein include clay, kaolin, talc, diatomaceous earth, calcium carbonate, aluminum hydroxide, magnesium hydroxide, titanium oxide, and mica. The grain size of these pigments is preferably selected properly to attain the desired smoothness. If it is incorporated in the underlayer, which is required to have a relatively high smoothness, the pigment preferably has a grain size of not more than 8 $\mu$m, more preferably from about 0.5 to 5 $\mu$m, attained by reducing the grain size of small diameter or large diameter particles to a small value. If it is incorporated in the back coat layer, which is required to have a lower smoothness than the underlayer, the pigment preferably has a greater grain size, i.e., from about 0.5 to 10 $\mu$m. The foregoing pigment is preferably incorporated in the underlayer in an amount of from 80 to 150 parts by weight based on 100 parts by weight of the resin or in the back coat layer in an amount of from 80 to 200 parts by weight based on 100 parts by weight of the resin. It is effective that the underlayer and back coat layer each comprise a water-resisting agent such as melamine resin and polyamide epichlorohydrin resin incorporated therein to obtain an excellent water resistance. For the measurement of the particle diameter of the foregoing pigment, a scanning electron microscope (SEM) is used. For particles which are not spherical, their projected areas are calculated in terms of circle.

In order to prepare the lithographic printing plate precursor of the present invention, a solution containing an underlayer component is optionally applied and dried onto one surface of a support to form an underlayer while a solution containing a back coat layer component is optionally applied and dried onto the other to form a back coat layer. A solution containing an image-receiving layer component is then applied and dried onto the one surface of the support to form an image-receiving layer. The coated amount of the image-receiving layer, underlayer and back coat layer are each preferably from 1 to 30 g/m$^2$, particularly from 6 to 20 g/m$^2$.

More preferably, the thickness of the water-resistant support having an underlayer and a back coat layer is from 90 to 130 $\mu$m, particularly from 100 to 120 $\mu$m.

The process for the formation of an image on the foregoing lithographic printing plate precursor (hereinafter also referred to as "master") will be described below. As the apparatus system for implicating such a process there may be used one shown in FIG. 1.

Figure 1:
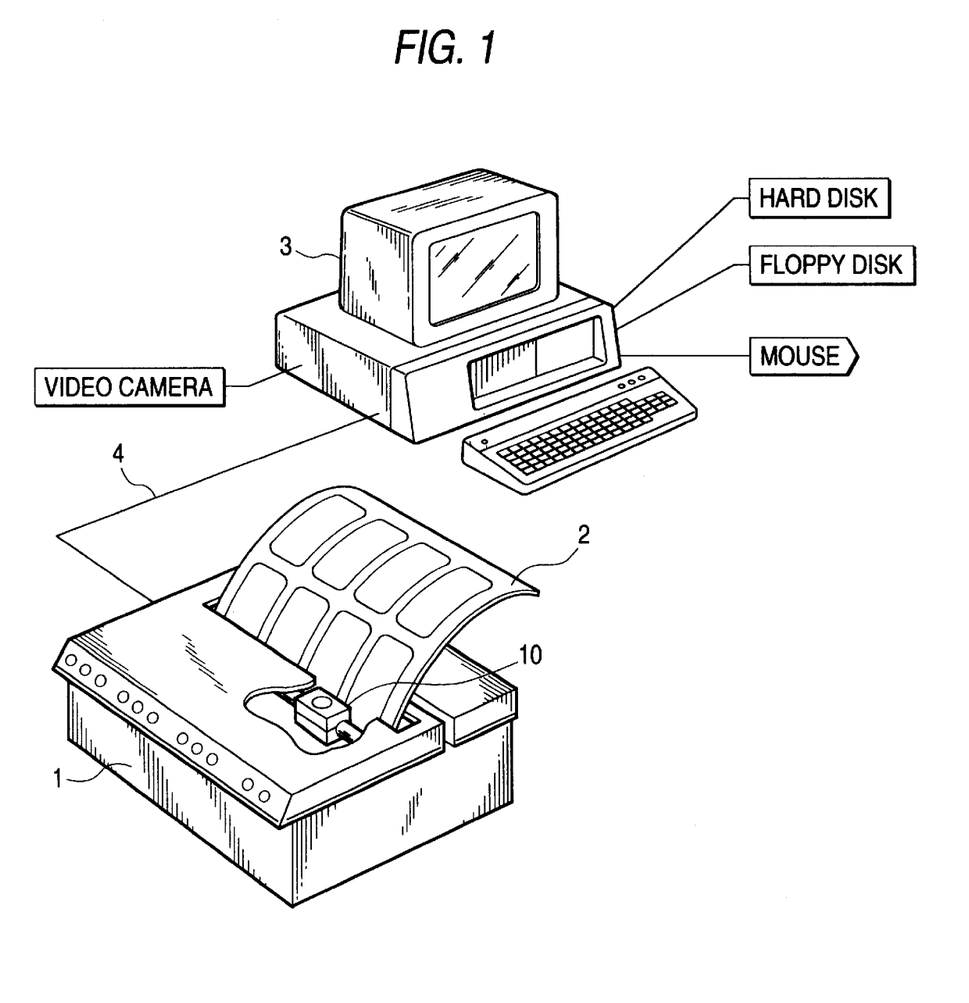
FIG. 1 is a schematic diagram illustrating an example of the apparatus system for use in the present invention.

The apparatus system shown in FIG. 1 comprises an ink jet recording apparatus 1 using an oily ink.

As shown in FIG. 1, a pattern data concerning an image (design and letters) to be formed on a master 2 is supplied from a data supply source such as computer 3 through a transmitting means such as bus 4 into an ink jet recording apparatus 1 using an oily ink. In the recording apparatus 1, an ink jet recording head 10 keeps an oily ink in reserve. When the master 2 passes through the interior of the recording apparatus 1, microfine droplets of ink are jetted onto the master 2 according to the foregoing data. In this manner, the ink is attached to the master 2 according to the foregoing pattern data.

Thus, an image is formed on the master 2 to obtain a printing plate master (printing plate precursor).

Figure 2:
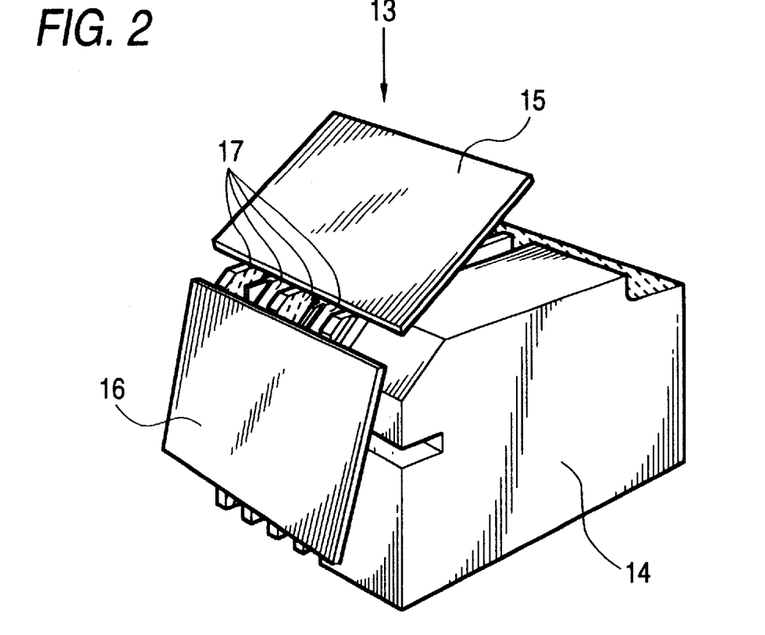
FIG. 2 is a diagram illustrating an example of (a part of) the head of the ink jet recording apparatus for use in the present invention.
Figure 3:
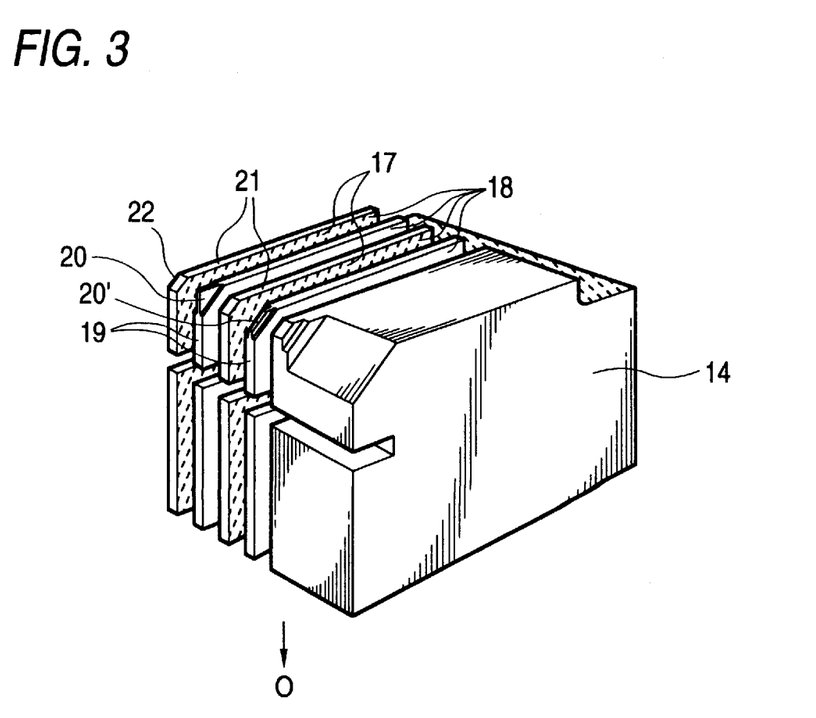
FIG. 3 is a diagram of the main body of the head shown in FIG. 2.

Examples of the configuration of the ink jet recording apparatus in the system shown in FIG. 1 are shown in FIGS. 2 and 3. In these figures, the common numerals are used for the components common with those shown in FIG. 1.

FIG. 2 is a diagram illustrating a part of such an ink jet recording apparatus. FIG. 3 is a diagram illustrating in detail the configuration of the ink jet recording apparatus.

The head 13 provided in the ink jet recording apparatus comprises a head main body 14 formed by an insulating material such as plastic and ceramic and meniscus-regulating plates 15 and 16 as shown in FIG. 2. In FIG. 2, the reference numeral 17 indicate s a jetting electrode for applying voltage. The head main body will be further described below in connection with FIG. 3, which is shown with omitting the meniscus-regulating plates.

The head main body 14 comprises a plurality of ink grooves 18 for circulating ink provided along the edge thereof. Provided inside these grooves is jetting electrode 17. Two adjacent ink grooves form a cell. Provided at the forward end of a partition 19 disposed at the center of the cell are jetting portions 20, 20. The partition 19 is thinner at the jetting portion than at the other portions and thus is sharpened at the jetting portion. The jetting portion may be slightly beveled at the forward end as shown in the jetting portion 20'. A plurality of cells (only two cells are shown in FIG. 3) are partitioned by a partition 21. The partition 21 is beveled at the forward end 22 such that it stands back from the jetting portions 20, 20'. An ink is allowed to flow from an ink supply means (not shown) through the ink groove in the direction shown by I in the head so that it is supplied to the jetting portion. Excess ink is then collected by an ink collecting means (not shown) in the direction shown by O. In this arrangement, a fresh ink is always supplied into the jetting portion. Under these conditions, a voltage is applied to the jetting electrode relative to a counter electrode (not shown) for holding the master 2 on the surface thereof, which is disposed opposed to the jetting portion so that the ink is jetted from the jetting portion to form an image on the master 2.

Thus, an image is formed on the lithographic printing plate precursor by the ink jet recording process using an oily ink to obtain a printing plate master.

If the lithographic printing plate precursor used comprises a hydrophilic surface, it can be used directly as a printing plate in offset printing.

On the other hand, if the lithographic printing plate precursor used is one requiring desensitization, it is subjected to surface treatment with a desensitizing solution so that the non-image area is desensitized to prepare a printing plate.

For the desensitization of zinc oxide, various known desensitizing solutions may be used such as cyanide-containing desensitizing solution comprising ferrocyanate or ferricyanate as a main component, cyan-free solution comprising ammine-cobalt complex, phytic acid, phytic acid derivative or guanidine derivative as a main component, desensitizing solution comprising as a main component an inorganic or organic acid constituting a chelate with zinc ion and desensitizing solution comprising a water-soluble polymer.

Examples of the cyanide-containing desensitizing solution include those disclosed in JP-B-44-9045, JP-B-46-39403, JP-A-52-76101, JP-A-57-107889, and JP-A-54-117201.

Examples of the phytic compound-containing desensitizing solution include those disclosed in JP-A-53-83807, JP-A-53-83805, JP-A-53-102102, JP-A-53-109701, JP-A-53-127003, JP-A-54-2803, and JP-A-54-44901.

Examples of the desensitizing solution containing a metal complex such as cobalt complex include those disclosed in JP-A-53-104301, JP-A-53-140103, JP-A-54-18304, and JP-B-43-28404.

Examples of the inorganic or organic acid-containing desensitizing solution include those disclosed in JP-B-39-13702, JP-B-40-10308, JP-B-43-28408, JP-B-40-26124, and JP-A-51-118501.

Examples of the guanidine compound-containing desensitizing solution include those disclosed in JP-A-56-111695.

Examples of the water-soluble polymer-containing desensitizing solution include those disclosed in JP-A-52-126302, JP-A-52-134501, JP-A-53-49506, JP-A-53-59502, JP-A-53-104302, JP-B-38-9665, JP-B-39-22263, JP-B-40-763, JP-B-40-2202, and JP-A-49-36402.

In any of these desensitizing treatments, zinc oxide in the surface layer is ionized to form zinc ion that then undergoes chelating reaction with a compound constituting a chelate in the desensitizing solution to form chelated zinc. It is thought that this chelated zinc is sedimented in the surface layer to render the surface layer hydrophilic.

The desensitization is normally effected at room temperature (15° C. to 35° C.) for 2 to 60 seconds. Using a fountain solution, the resulting printing plate allows about several thousands sheets of offset printing.

The present invention will be described in greater detail with reference to the following Preparation Examples and Examples, but the invention should not be construed as being limited thereto.

Examples of the preparation of dispersed resin particles for ink (PL) are described below.

PREPARATION EXAMPLE 1

Preparation of Resin Particles (PL-1)

A mixture of 10 g of a dispersion-stabilizing resin (Q-1) having the structure shown below, 99 g of vinyl acetate, 1 g of octadecyl methacrylate and 290 g of Isoper H was heated to a temperature of 75° C. with stirring in a stream of nitrogen. To the mixture was then added 1.2 g of 2,2'-azobis (isovaleronitrile)(abbreviated as "A.I.V.N.") as a polymerization initiator. The reaction mixture was then reacted for 4 hours. To the reaction mixture was then added 1.0 g of the same polymerization initiator. The reaction mixture was then reacted for 3 hours. The temperature of the reaction mixture was then raised to 100° C. where it was then stirred to distill unreacted vinyl acetate off. The reaction solution was allowed to cool, and then passed through a 200-mesh nylon cloth to obtain a latex having a percent polymerization of 90%, an average particle diameter of 0.40 μm and a good monodispersibility in the form of white dispersion. For the measurement of particle diameter, CAPA-500 (produced by HORIBA, Ltd.) was used.

The white dispersion was then partly subjected to centrifugal separation by a centrifugal separator (rotary speed: 1×10⁴ r.p.m.; rotation time: 60 minutes). The particulate resin content thus sedimented was collected, and then dried. The particulate resin content thus collected exhibited a weight-average molecular weight (Mw: GPC value in polystyrene equivalence) of 2×10⁵ and a glass transition point (Tg) of 38° C.

Dispersion-stabilizing resin (0-1)

Mw: 5×10⁴ (Figure indicates weight ratio)

PREPARATION EXAMPLE 2

Preparation of Resin Particles (PL-2)

A mixture of 14 g of a dispersion-stabilizing resin (Q-2) having the structure shown below and 286 g of Isoper G286 was heated to a temperature of 65° C. with stirring in a stream of nitrogen. To the mixture was then added a mixture of 30 g of methyl methacrylate, 62.5 g of methyl acrylate, 7.5 g of 2-(N,N-dimethylamino)ethyl methacrylate and 1.5 g of A.I.V.N. in 1 hour. The reaction mixture was then reacted for 2 hours. To the reaction mixture was then added 1.5 g of A.I.V.N. The reaction mixture was then reacted for 2 hours. To the reaction mixture was then added 0.8 g of 2,2'-azobisisobutyronitile (abbreviated as "A.I.B.N.") The reaction mixture was heated to a temperature of 80° C. where it was then reacted for 3 hours.

The reaction mixture was heated to a temperature of 100° C. where unreacted monomers were then distilled off under a pressure of from 10 to 20 mmHg. The reaction solution was allowed to cool, and then passed through a 200-mesh nylon cloth to obtain a latex having a percent polymerization of 90%, an average particle diameter of 0.45 μm and a good monodispersibility in the form of white dispersion. The particulate resin content exhibited Mw of 2×10⁵ and Tg of 40° C.

Dispersion-stabilizing resin (0-2)

Mw: 6×10⁴ (Figure indicates weight ratio)

PREPARATION EXAMPLE 3

Preparation of Resin Particles (PL-3)

A mixture of 15 g of a dispersion-stabilizing resin (Q-3) having the structure shown below and 553 g of Isoper H was heated to a temperature of 50° C. with stirring in a stream of nitrogen.

To the mixture was then added a mixture of 50 g of methyl methacrylate, 45 g of ethyl acrylate, 5 g of 2-(N,N-diethylamino)ethyl acrylate, 1.3 g of methyl 3-mercaptopropionate and 1.0 g of A.I.V.N. in 30 minutes. The reaction mixture was then reacted for 2.5 hours. To the reaction mixture was then added 0.8 g of A.I.V.N. The reaction mixture was then reacted for 2 hours. To the reaction mixture was then added 0.8 g of A.I.B.N. The reaction mixture was heated to a temperature of 80° C. where it was then reacted for 2 hours.

The reaction solution was allowed to cool, and then passed through a 200-mesh nylon cloth to obtain a latex having a percent polymerization of 99%, an average particle diameter of 0.38 μm and a good monodispersibility in the form of white dispersion. The particulate resin content exhibited Mw of 3×10⁴ and Tg of 37° C.

Dispersion-stabilizing resin (0-3)

Mw: 6×10⁴ [Mw of graft moiety: 1×10⁴]
(Figure indicates weight ratio)

PREPARATION EXAMPLE 4

Preparation of Resin Particles (PL-4)

A mixture of 15 g of a dispersion-stabilizing resin (Q-4) having the structure shown below, 95 g of vinyl acetate, 5 g of crotonic acid and 280 g of Isoper G was heated to a temperature of 75° C. with stirring in a stream of nitrogen. To the mixture was then added 1.5 g of A.I.V.N. The reaction mixture was then reacted for 3 hours. To the reaction mixture was then added 10 g of A.I.V.N. The reaction mixture was then reacted at a temperature of 80° C. for 3 hours. To the reaction mixture was then added 1.0 g of A.I.V.N. The reaction mixture was heated to a temperature of 85° C. where it was then reacted for 3 hours. The reaction mixture was heated to a temperature of 100° C. wherein unreacted vinyl acetate monomers were then distilled off.

Thereafter, to the reaction mixture was then added 5 g of Victoria Blue as a basic dye at a temperature of 100° C. The reaction mixture was then stirred for 4 hours to dye the particles.

The reaction solution was then passed through a 200-mesh nylon cloth to obtain a latex having a percent polymerization of 95% and an average particle diameter of 0.38 μm in the form of blue dispersion.

The reaction mixture which had not yet been dyed was partly collected. The particulate resin content exhibited Mw of 9×10⁴ and Tg of 43° C.

Dispersion-stabilizing resin (0-4)

Mw: $3 \times 10^4$

PREPARATION EXAMPLE 5

Preparation of Resin Particles (PL-5)

A 30/65/5 (by weight) copolymer of methyl methacrylate, methyl acrylate and octadecyl methacrylate (glass transition point: 38° C.) as a coating resin and Carbon Black #40 (produced by Mitsubishi Chemical Corporation) as a coloring pigment were thoroughly mixed in a proportion of 8/2, and then melt-kneaded by means of a three-roll mill which had been heated to a temperature of 120° C. 20 g of the material thus kneaded, 5.5 g of a dispersion-stabilizing resin (Q-5) having the structure shown below and 125 g of Isoper G were then charged into a paint shaker (produced by Toyo Seiki Seisakusho, Ltd.) with glass beads having a diameter of about 4 mm as media. The mixture was then subjected to predispersion. The predispersion thus obtained was then subjected to wet dispersion at 4,500 r.p.m. by means of a Type KDL dynomill (produced by Shinmaru Enterprises Corp.) with glass beads having a diameter of from 0.75 to 1 mm as media. The dispersion thus obtained was then passed through a 200-mesh nylon cloth to obtain a latex having an average particle diameter of 0.50 μm in the form of black dispersion.

Dispersion-stabilizing resin (0-5)

Mw: $5 \times 10^4$ ("-b-" indicates a block bonding.)

EXAMPLE 1

Preparation of Oily Ink (IK-1)

To a mixture of 6 g (as calculated in terms of solid content) of the foregoing particulate resin (PL-4), 0.01 g of zirconium naphthenate and 0.1 g of a fluorine compound (SD-1) having the structure shown below was added Isoper G (boiling point: 158–177° C.; ignition point: 41° C.) to make 100 g.

The particles dispersed in the blue oily ink were positively chargeable.

Fluorine compound (SD-1)

Mw: $2 \times 10^3$ (weight composition ratio)

In order to determine the chargeability of the ink, the ink was then measured for ac electrical conductivity (ps/cm) in the following manner. The results were 550 (ps/cm). The ink exhibited a surface tension of 19.7 dyne/cm (25° C.) and a viscosity of 1.20 (25° C.).

Measurement of ac Electrical Conductivity

For the measurement of ac electrical conductivity of ink, a Type AG-4311 LCR meter (produced by ANDO ELECTRIC CO., LTD.) was used. In operation, the LCR meter was connected to an electrode for liquid (LP-05, produced by KAWAGUCHI ELECTRIC WORKS CO., LTD.; electrode constant: 198) disposed in an aluminum sealed box made by the inventors filled with 2.3 cc of the ink to be measured through a test lead (AG-4912, produced by ANDO ELECTRIC CO., LTD.). In this arrangement, the ink was measured for conductance at an applied voltage of 5 V and a frequency of 1 kHz. The conductance thus determined was then divided by the electrode constant to determine electrical conductivity. For the measurement, the measurement parameter of LCR meter was set by capacitance. The circuit mode was set to parallel mode.

Figure 4:
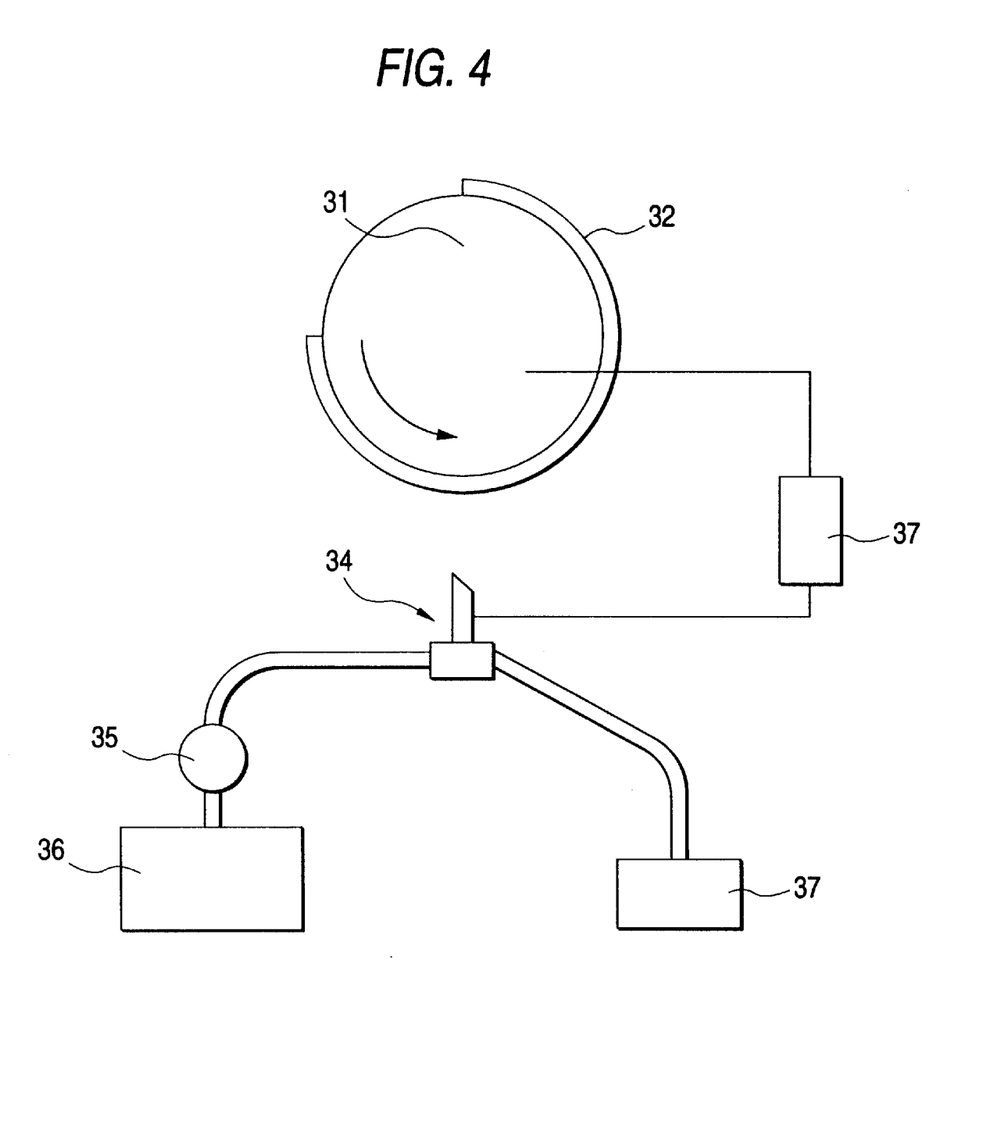
FIG. 4 is a diagram illustrating the jetting apparatus used in Examples.

Using a jetting apparatus as shown in FIG. 4, the foregoing oily ink was printed on SIM master (produced by AM JAPAN CO., LTD.), a dry electrophotographic lithographic printing plate precursor for light printing which is used as a transfer material.

The jetting needle 34 used was made of stainless steel. The jetting needle had an inner diameter of 360 μm, an outer diameter of 615 μm, a tip cutting angle of 19° and a radius of curvature of 13 μm. The ink was stably supplied from an ink tank 36 with a supplying pump 35 through the interior of the needle to the tip thereof. Excess ink was allowed to flow down along the outer surface of the needle so that it was recovered in a waste liquor tank 37. The flow rate of ink was 0.75 cc/min. The jetting needle was disposed at a distance of 300 μm from the surface of the foregoing printing plate 32 mounted on a counter electrode 31. In this arrangement, by an electric source 33, a pulse voltage of 800 V plus a bias voltage of 700 V with a width of 100 μsec. was applied to the jetting needle with a wave of 2.5 kHz imposed thereon during printing.

The number of actually printed dots relative to the applied number of pulses on the sample was then examined. The results were 100%, demonstrating that jetting was perfect.

Judging from the scanning electron microphotograph (SEM) of dots thus printed, these dots were found to be spheres having a diameter of 25 μm. The thickness of the image layer was found to be 1.5 μm.

The oily ink (IK-1) was then printed on the foregoing SIM master (lithographic printing plate precursor) disposed above the counter electrode disposed at a distance of 500 μm from the ink jetting head shown in FIG. 2 mounted on the pen plotter portion in a remodeled version of a Type DA8400 servo plotter produced by Graphtech Corp., which allows drawing of output from personal computer.

Subsequently, using RICOH FUSER Model 592 (produced by RICOH CO., LTD.), the ink image was heated such that the surface temperature thereof reached 80° C. for 1 minute to fix the image area thoroughly.

The image drawn on the printing matter (i.e., printing plate) thus obtained was visually observed under an optical microscope at a 200×magnification. As a result, there were no defects in the image thus drawn. The fine lines and letters in the image were good and showed no defects such as feathering, lack and batter. Further, there were found no stain on the non-image area.

Using an offset printing black ink, the printing plate thus prepared was then passed through a Type AM-2850 full-automatic printing machine (produced by AM JAPAN CO., LTD.) with a desensitizing solution (ELP-E2, produced by Fuji Photo Film Co., Ltd.) being charged in the etcher portion thereof and a solution obtained by diluting the desensitizing solution with distilled water by a factor of 4 being charged into the fountain solution receiving pan to effect printing.

As a result, 3,000 or more sheets of printed matters having a sharp image free of background stain were obtained.

COMPARATIVE EXAMPLE A

The procedure of Example 1 was followed except that the oily ink (IK-1) was replaced by the oily ink (IKR-1) having the following formulations.

Preparation of Comparative Oily Ink (IKR-1)

The ink (IKR-1) was prepared in the same manner as for the oily ink (IK-1) except that the fluorine compound (SD-1) was not used.

The ink thus prepared was then measured for physical properties in the same manner as in Example 1.

ac electrical conductivity of ink: 550 (ps/cm)

Surface tension: 21.8 dyne/cm; viscosity: 1.21

Under the same jetting conditions as used in Example 1, the foregoing ink exhibited a percent jetting of 30%. The jetting conditions under which a percent jetting of 100% is attained were then examined. As a result, the jetting voltage required was found to be not lower than 1.2 KV, far higher than that of Example 1, and the pulse voltage application time required was too long. Dots printed for a pulse voltage application time of not less than 250 μm under these conditions were then observed on SEM photograph. As a result, these dots were found deformed ellipsoidally. These dots also had an average diameter of about 50 μm. The thickness of the image layer was as small as from 0.3 to 0.4 μm. Further, minute dots were found scattered around these dots, showing "satellite" phenomenon.

The image on the printing plate formed by a drawing apparatus in the same manner as in Example 1 showed lack and feathering on fine image portions such as fine letters and fine lines.

As demonstrated above, the oily ink of the present invention can be stably jetted and concentrated fairly even when the applied voltage is low, forming a sharp high precision image free of stain. The resulting image can exhibit a high impression capacity even when used as a printing plate.

EXAMPLE 2

Preparation of Lithographic Printing Plate Precursor

The composition having the following formulations was subjected to dispersion in a paint shaker (produced by Toyo Seiki Seisakusho, Ltd.) with glass beads for 60 minutes. The glass beads were then removed by filtration to obtain a dispersion.

| | |
|---|---|
| Gelatin | 10 g |
| Silica: Silicia 310 (produced by Fuji Silicia Chemical Corp.) | 5 g |
| 20% Colloidal silica solution: Snowtech CR503 (produced by Nissan Chemical Industries, Ltd.) | 38 g |
| Fluorinated alkylester FC430 (produced by 3M Corp.) | 0.8 g |
| Hardening compound $CH_2$=$CHSO_2CH_2CONH(CH_2)_3NHCOCH_2SO_2CH$=$CH_2$ | 0.24 g |
| water content | 54 g |

The foregoing composition was applied to the support of a Type ELP-11 master (produced by Fuji Photo Film Co., Ltd.), which is used as an electrophotographic lithographic printing plate precursor for light printing, by means of a wire bar, and then dried at a temperature of 100° C. for 10 minutes to form an image-receiving layer having a coated amount of 8 g/m². Thus, a lithographic printing plate precursor was obtained. The image-receiving layer thus obtained was then measured for surface smoothness (sec/10 cc) at an air capacity of 10 cc by means of a Bekk smoothness testing machine (produced by Kumagai Kogyo Co., Ltd.). The results were 250 (sec/10 cc). The image-receiving layer exhibited an angle of 0° with respect to water. For the measurement of contact angle with respect to water, a surface contact meter (CA-D, produced by Kyowa Interface Science Corporation Limited) was used.

Preparation of Oily Ink (IK-2)

10 g of a polydodecyl methacrylate, 10 g of alkali blue and 30 g of Shell Sol 71 were subjected to dispersion with glass beads in a paint shaker (produced by Toyo Seiki Seisakusho, Ltd.) for 4 hours. The glass beads were then removed by filtration to obtain a fine blue dispersion.

50 g (as calculated in terms of solid content) of the particulate resin (PL-1) of Example 1 of preparation of particulate resin, 18 g of the foregoing alkali blue dispersion, 0.5 g of the fluorine compound (SD-2) having the structure shown below and 0.02 g of an octadecene-semi-octadecylamide maleate copolymer were diluted in 1 l of Isoper E to prepare a blue oily ink.

Fluorine compound (SD-2)

Mw = 3×10³
(Mw of dodecyl methacrylate moiety: 1×10³)

The foregoing ink was then measured for physical properties in the same manner as in Example 1.

ac electrical conductivity of ink: 480 (ps/cm)

Surface tension: 20.0 dyne/cm; viscosity: 1.22

Using a lithographic printing plate precursor prepared on a transfer material in the same manner as in Example 1, the foregoing oily ink (IK-2) was examined for jettability. The results were 100%. The dots thus printed were found to be spheres having a diameter of 25 μm. The image layer had a thickness of 1.8 μm.

An image was then formed on the foregoing lithographic printing plate precursor by means of a drawing machine in the same manner as in Example 1 to prepare a printing plate. Using this printing plate, printing was effected on Oliver 94 type printing material (produced by Sakurai Seisakusho K.K.) with a solution obtained by diluting SLM-OD (produced by Mitsubishi Paper Mills, Ltd.) with water by a factor of 30 as a fountain solution and an offset printing black ink.

As a result, 10,000 or more sheets of printed matters having a sharp image free of lack in fine lines and letters and background stain were obtained.

EXAMPLES 3 to 11

The plate making and printing procedures of Example 1 were followed except that the oily ink (IK-1) was replaced by the oily inks set forth in Table 1 below, respectively.

Preparation of Oily Inks

To a mixture of 6 g (as calculated in terms of solid content) of the foregoing particulate disperse resin (PL-2), 2.5 g of the foregoing alkali blue, 0.04 g of lecithin (soybean) as a charge controller and the fluorine compound (SD) set forth in Table 1 below was added Isoper G to make 100 g. Thus, blue oily inks were prepared.

TABLE 1

| Ex. No. | Oil ink | Fluorine compound | Fluorine compound | |
|---|---|---|---|---|
| 3 | IK-3 | SD-3 | $F(CF(CF_3)-CF_2-O)_{\overline{m}}CF(CF_3)CH_2O-Si(CH_3)_2OSi(CH_3)_4$ <br> (Mw: $3 \times 10^3$) | 0.2 g |
| 4 | IK-4 | SD-4 | $F(CF_2CF_2CF_2O)_{\overline{m}}CF_2CF_2CON(C_2H_5)C_{22}H_{45}$ <br> (Mw: $2.5 \times 10^3$) | 0.1 g |
| 5 | IK-5 | SD-5 | $-(N-CH_2CH_2)_{\overline{40}}(N-CH_2CH_2)_{\overline{60}}-$ <br> with $COC_7F_{15}$ and $C_{10}H_{21}$ substituents <br> (Mw: $4 \times 10^3$) | 0.1 g |
| 6 | IK-6 | SD-6 | $-(CH_2-C(CH_3)(COOCH_2CF_2CFHCFH_2))_{\overline{45}}(CH_2-CH(COOC_{14}H_{29}))_{\overline{55}}-$ <br> (Mw: $2.5 \times 10^3$) | 0.3 g |
| 7 | IK-7 | SD-7 | $-(CH_2-CH(COO(CH_2)_2N(C_3H_7)SO_2C_8F_{17}))_{\overline{30}}(CH_2-CH(COOC_{18}H_{37}))_{\overline{70}}-$ <br> (Mw: $2 \times 10^4$) | 0.2 g |
| 8 | IK-8 | SD-8 | Fluorine-based surface active agent: SURFLON ® SC105 (produced by Asahi Glass Co., Ltd.) | 0.1 g |
| 9 | IK-9 | SD-9 | Fluorine-based surface modifier: MEGFAFAC ® F178A (produced by DAINIPPON INK & CHEMICALS, INC.) | 0.3 g |
| 10 | IK-10 | SD-10 | $-(CH_2-CH(COOCH_2CF_2CF_2CF_2H))_{\overline{40}}(CH_2-CH(COOC_{13}H_{27}))_{\overline{60}}-$ <br> (Mw: $2 \times 10^3$) | 0.15 g |
| 11 | IK-11 | SD-11 | $-(CH_2-CH(C_{16}H_{33}))_{\overline{50}}(CH(COOC_2H_5)-CH(COOCH_2C_8F_{17}))_{\overline{50}}-$ <br> (Mw: $3 \times 10^3$) | 0.1 g |

All the various oily inks exhibited an ac electrical conductivity of from 510 to 520 (ps/cm), a surface tension of from 19.0 to 20.0 and a viscosity of from 1.2 to 1.5.

These oily inks were then examined for jettability in the same manner as in Example 1. As a result, all these oily inks exhibited a percent jetting of 100%. The dots thus printed were found to be spheres having a diameter of from 25 to 30 µm. The image layer had a thickness of from 1.5 to 1.8 µm.

Plate making and printing were then effected in the same manner as in Example 2. All these printing plates obtained from the foregoing oily inks gave 10,000 or more sheets of printed matters having a sharp image free of background stain.

EXAMPLE 12

Preparation of Water-resistant Support

As a substrate there was used a high quality paper having a weight of 100 g/m$^2$. An underlayer coating compound having the following formulation was then applied to one surface of the substrate by means of a wire bar to form an underlayer having a dried weight of 10 g/m$^2$ thereon. The surface smoothness of the underlayer was 150 sec/10 cc. The underlayer was then calendered so that the surface smoothness thereof was adjusted to 1,500 sec/10 cc.

| Underlayer coating compound | |
| --- | --- |
| Silica gel | 10 parts by weight |
| SBR latex (50 wt-% aqueous dispersion; Tg: 25° C.) | 92 parts by weight |
| Clay (45 wt-% aqueous dispersion) | 110 parts by weight |
| Melamine (80 wt-% aqueous solution) | 5 parts by weight |
| water content | 191 parts by weight |

A back coat coating compound having the following formulation was then applied to the other surface of the substrate by means of a wire bar to form a back coat layer having a dried weight of 12 g/m$^2$. The back coat layer was then calendered so that the surface smoothness thereof reached about 50 sec/10 cc.

| Back coat layer coating compound | |
| --- | --- |
| Kaolin (5-% aqueous dispersion) | 200 parts by weight |
| 10% Aqueous solution of polyvinyl alcohol | 60 parts by weight |
| SBR latex (solid content: 49%; Tg: 0° C.) | 100 parts by weight |
| Initial condensate of melamine (solid content: 80%; Sumiret Resin SR-613) | 5 parts by weight |

Preparation of Lithographic Printing Plate Precursor

The composition having the following formulations was subjected to dispersion in a paint shaker with glass beads for 80 minutes. The glass beads were then removed by filtration to obtain a dispersion.

| | |
| --- | --- |
| Silica: Silicia 4445 (produced by Fuji Silicia Chemical Corp.) | 40 g |
| 20% solution of silica gel: Snowtech CR (produced by Nissan Chemical Industries, Ltd.) | 200 g |
| 50% Clay dispersion | 40 g |
| Polyvinyl alcohol: 10% PVA-117 solution (produced by KURARAY CO., LTD.) | 120 g |
| Melamine resin composition | 2.0 g |
| Ammonium chloride | 0.2 g |
| Water | 50 g |

The foregoing dispersion was applied to the foregoing water-resistant support in an amount of 8 g/m$^2$, and then dried to prepare a lithographic printing plate precursor having a surface smoothness of 220 sec/10 cc. The printing plate precursor thus prepared exhibited a contact angle of 0° with respect to water.

The printing plate precursor thus prepared was then subjected to plate making in the same manner as in Example 2 to form a printing plate. Using this printing plate, offset printing was effected.

However, the oily ink (IK-12) having the following formulations was used instead of the oily ink (IK-1) used in Example 1.

Preparation of Oily Ink (IK-12)

To a mixture of 6 g (as calculated in terms of solid content) of the particulate disperse resin (PL-5), 0.02 g of basic barium petronate and 0.2 g of the fluorine compound (SD-3) was added a 3/2 (by weight) mixture of hexamethyl disiloxane and Isoper G to make 100 g. Thus, a black oily ink was prepared. The oily ink thus prepared exhibited an ac electrical conductivity of 430 (ps/cm), a surface tension of 18.5 dyne/cm and a viscosity of 1.15 cs.

The resulting printed matter had a sharp image quality free of stain on the non-image area as in the printing plate of Example 2. 3,000 or more sheets were printed, showing a good impression capacity.

The oily ink was then examined for jettability in the same manner as in Example 1. As a result, the oily ink exhibited a percent jetting of 100%. The dots thus printed were found to be spheres having a diameter of 30 µm. The image layer had a thickness of 2.0 µm.

EXAMPLE 13

Preparation of Oily Ink (IK-13)

10 g of the dispersion-stabilizing resin (Q-3), 20 g of a blue pigment (MicroLith Blue4GT, produced by Ciba Geigy Inc.) and 150 g of Isoper G were subjected to dispersion with glass beads in a paint shaker for 8 hours. The glass beads were removed by filtration to obtain a black dispersion. The particulate pigment thus obtained exhibited an average particle diameter of 0.36 µm.

To a mixture of 5 g (as calculated in terms of solid content) of the particulate disperse resin (PL-3), 0.3 g of the foregoing blue dispersion, 0.03 g of potassium dioctylsulfosuccinate and 0.2 g of the fluorine compound (SD-13) having the structure shown below was then added Isoper G to make 100 g. Thus, a blue oily ink was prepared.

Fluorine compound (SD-3)

(Mw: 1.5×10³) ("-b-" indicates a block bonding)

The ink thus obtained exhibited a chargeability of 480 (ps/cm), a surface tension of 19.5 dyne/cm and a viscosity of 1.75 cs.

The plate-making procedure of Example 2 was followed except that the foregoing oily ink (IK-13) was used instead of the oily ink (IK-2). As a result, a printed matter having a sharp image free of lack in fine lines and letters was obtained. The dots thus printed had a thickness of 2.0 µm and were free of feathering and strain. Thus, these dots showed a good circularity.

Using this printing plate, printing was effected in the same manner as in Example 2. As a result, 10,000 or more sheets of printed matters having a sharp image free of background stain were obtained.

In accordance with the present invention, an oily ink for electrostatic attraction ink jet recording can be obtained which can be stably jetted fairly and can form a high precision fine sharp image with an excellent image strength.

Further, the use of an electrostatic attraction ink jet recording process with an oily ink according to the present invention makes it possible to give a large number of sheets of printed matters having a sharp image.

While the invention has been described in detail and with reference to specific examples thereof, it will be apparent to one skilled in the art that various changes and modifications can be made therein without departing from the spirit and scope thereof.

What is claimed is:

1. An ink composition for electrostatic attraction ink jet, which composition comprises:

a nonaqueous solvent having an electrical resistance of not lower than $10^9$ Ω·cm and a dielectric constant of not more than 3.5;

a dispersoid dispersed in said nonaqueous solvent, which comprises at least a solid particulate material having an average particle diameter of from 0.1 to 3 µm; and at least one fluorine-based surface active agent soluble in said nonaqueous solvent, said surface active agent being present in an amount of from 0.05 to 5% by weight based on the weight of the ink composition.

2. The ink composition according to claim 1, wherein said solid particulate material is a positively or negatively charge detectable particulate material.

3. The ink composition according to claim 1, wherein said solid particulate material comprises a particulate resin material which is hydrophobic and which stays solid at least at ordinary temperature.

4. The ink composition according to claim 1, wherein said fluorine-based surface active agent is a polymer compound comprising a polymer component containing a fluorine-containing substituent having a weight-average molecular weight of from 800 to 30,000.

5. An electrostatic attraction ink jet recording process, which comprises the steps of:

supplying an oily ink composition containing a solid particulate material into a jetting portion;

applying an electric potential to the jetting portion to form agglomerations of the solid particulate material; and jetting the agglomerations from the jetting portion by electrostatic means, wherein said ink composition is an ink composition according to claim 1.

6. The electrostatic attraction ink jet recording process according to claim 5 further comprising a step of collecting the oily ink composition.

* * * * *